United States Patent
Leman et al.

(10) Patent No.: US 6,260,709 B1
(45) Date of Patent: *Jul. 17, 2001

(54) MEMBRANE FILTER ELEMENT FOR CHEMICAL-MECHANICAL POLISHING SLURRIES

(75) Inventors: Derek A. Leman, Indianapolis; Alfred K. Fritzsche, Carmel, both of IN (US)

(73) Assignee: Parker-Hannifin Corporation, Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/188,647

(22) Filed: Nov. 9, 1998

(51) Int. Cl.[7] ................................................ B07B 1/20
(52) U.S. Cl. .................... 209/305; 209/273; 209/300; 210/493.1; 210/487
(58) Field of Search ............................ 209/273, 281, 209/300, 305; 210/487, 493.1, 493.4, 493.5

(56) References Cited

U.S. PATENT DOCUMENTS

| | | |
|---|---|---|
| 3,585,395 * | 6/1971 | Robkin et al. ................. 250/219 |
| 3,846,523 | 11/1974 | Osterholtz . |
| 3,852,134 | 12/1974 | Bean . |
| 3,992,495 | 11/1976 | Sano et al. . |

(List continued on next page.)

FOREIGN PATENT DOCUMENTS

| | | |
|---|---|---|
| 1389199 * | 4/1975 | (GB) . |
| 05111622 * | 5/1993 | (JP) . |
| WO 98/30317 | 7/1989 | (WO) . |

OTHER PUBLICATIONS

Whatman, Inc. Technical Information on Cyclopore™ Membranes.

Whatman, Inc., product literature on Membrane Technology, copyrighted 1998.

Cyclopore product literature on Cyclotron Precision Membranes.

Product literature entitled "Nucleopore Cartridge Filtration Products" (undated).

Product literature of Osmonics (undated).

(List continued on next page.)

*Primary Examiner*—Donald P. Walsh
*Assistant Examiner*—David A Jones
(74) *Attorney, Agent, or Firm*—John A. Molnar, Jr.

(57) ABSTRACT

A filter media for physically separating particles of an abrasive media having a given mean average particle size from a chemical-mechanical polishing (CMP) slurry. The abrasive media has a particle size distribution including particles larger than the mean average particle size. The filter media is provided as being formed of at least one sheet of a porous membrane having a first and second surface defining a thickness dimension of the membrane therebetween, and having a plurality of generally cylindrical capillary pores formed through the thickness dimension sized effective to capture the particles larger than the mean average particle size. In service, the slurry is supplied to the first side of the filter media, and is passed through the media to the second side thereof such that at least a portion of the particles of the abrasive media larger than the mean average particle size is retained on the first side of the filter media. Such portion may include particles of the abrasive media which are smaller than the pore size of the membrane.

13 Claims, 4 Drawing Sheets

Fig. 3

U.S. PATENT DOCUMENTS

| Patent | | Date | Inventor | Class |
|---|---|---|---|---|
| 4,188,354 | | 2/1980 | Munari et al. | |
| 4,268,347 | | 5/1981 | Stephens. | |
| 4,431,545 | * | 2/1984 | Pall et al. | 210/641 |
| 4,617,124 | * | 10/1986 | Pall et al. | 210/638 |
| 4,770,785 | | 9/1988 | Schaupert. | |
| 4,824,568 | * | 4/1989 | Allegrezza et al. | 210/490 |
| 4,863,604 | | 9/1989 | Lo et al. | |
| 4,872,888 | | 10/1989 | Ehrfeld et al. | |
| 4,936,991 | * | 6/1990 | Peyton et al. | 210/356 |
| 4,956,219 | | 9/1990 | Legras et al. | |
| 5,041,220 | * | 8/1991 | Lee et al. | 210/321.8 |
| 5,324,425 | * | 6/1994 | Ellison | 210/167 |
| 5,376,278 | * | 12/1994 | Salem | 210/679 |
| 5,449,917 | | 9/1995 | Clements. | |
| 5,632,791 | * | 5/1997 | Oussoren et al. | 55/486 |
| 5,653,831 | * | 8/1997 | Spencer | 156/69 |
| 5,664,990 | * | 9/1997 | Adams et al. | 451/60 |
| 5,753,014 | | 5/1998 | Van Rijn. | |
| 5,791,970 | * | 8/1998 | Yueh | 451/8 |
| 5,817,233 | * | 10/1998 | Cooper | 210/223 |
| 5,855,792 | * | 1/1999 | Adams et al. | 210/696 |
| 5,895,315 | * | 5/1999 | Pinder, Jr. | 451/60 |
| 5,904,846 | * | 5/1999 | Clements et al. | 210/321.77 |
| 5,928,492 | * | 7/1999 | Corlett et al. | 205/742 |
| 5,965,027 | * | 10/1999 | Allen et al. | 210/638 |
| 5,979,668 | * | 11/1999 | Kane et al. | 210/446 |
| 5,993,647 | * | 11/1999 | Huang et al. | 210/87 |
| 6,015,499 | * | 1/2000 | Hayden | 210/767 |

OTHER PUBLICATIONS

Product literature of Nucleopore for "Quick Rinse—2 Membrane Cartridges for Critical Fluid Filtration in Electroniocs" (undated).

Product literature on DeTec Membrane Cartridges copyrighted 1997.

* cited by examiner (PRIOR ART)

MEMBRANE FILTER ELEMENT FOR CHEMICAL-MECHANICAL POLISHING SLURRIES

BACKGROUND OF THE INVENTION

The present invention relates broadly to filters for chemical-mechanical polishing (CMP) slurries, and more particularly to an ion track-etched or other capillary pore membrane filter element having a pore structure exhibiting a sharp retention cut-off with an improved service life.

In the general mass production of semiconductor devices, hundreds of identical "integrated" circuit (IC) trace patterns are photolithographically imaged over several layers on a single semiconducting wafer which, in turn, is cut into hundreds of identical dies or chips. Within each of the die layers, the circuit traces are isolated from the next layer by an insulating material. In as much as it is difficult to photolithographically image a rough surface, it is desirable that the insulating layers are provided as having a smooth surface topography or, as is termed in the vernacular, a high degree of planarity. In this regard, a relatively rough surface topography may be manifested as a depth of filed problem resulting in poor resolution of the patterns of subsequently deposited layers, and, in the extreme, in the short circuiting of the device. As circuit densities in semiconductor dies continue to increase, any such defects become unacceptable and may render the circuit either inoperable or lower its performance to less than optimal.

To achieve the relatively high degree of planarity required for the production of substantially defect free IC dies, a chemical-mechanical polishing (CMP) process is becoming increasingly popular. Such process involves chemically etching the wafer surface in combination with mechanical polishing or grinding. This combined chemical and mechanical action allows for the controlled removal of material.

In essential operation, CMP is accomplished by holding the semiconductor wafer against a rotating polishing surface, or otherwise moving the wafer relative to the polishing surface, under controlled conditions of temperature, pressure, and chemical composition. The polishing surface, which may be a planar pad formed of a relatively soft and porous material such as a blown polyurethane, is wetted with a chemically reactive and abrasive aqueous slurry. The aqueous slurry, which may be either acidic or basic, typically includes abrasive particles, a reactive chemical agent such as a transition metal chelated salt or an oxidizer, and adjuvants such as solvents, buffers, and passivating agents. Within the slurry, the salt or other agent provides the chemical etching action, with the abrasive particles, in cooperation with the polishing pad, providing the mechanical polishing action. The basic CMP process is further described in the following U.S. Pat. Nos.: 5,709,593; 5,707,274; 5,705,435; 5,700,383; 5,665,201; 5,658,185; 5,655,954; 5,650,039; 5,645,682; 5,643,406; 5,643,053; 5,637,185; 5,618,227; 5,607,718; 5,607,341; 5,597,443; 5,407,526; 5,395,801; 5,314,843; 5,232,875; and 5,084,071.

Figure 1:
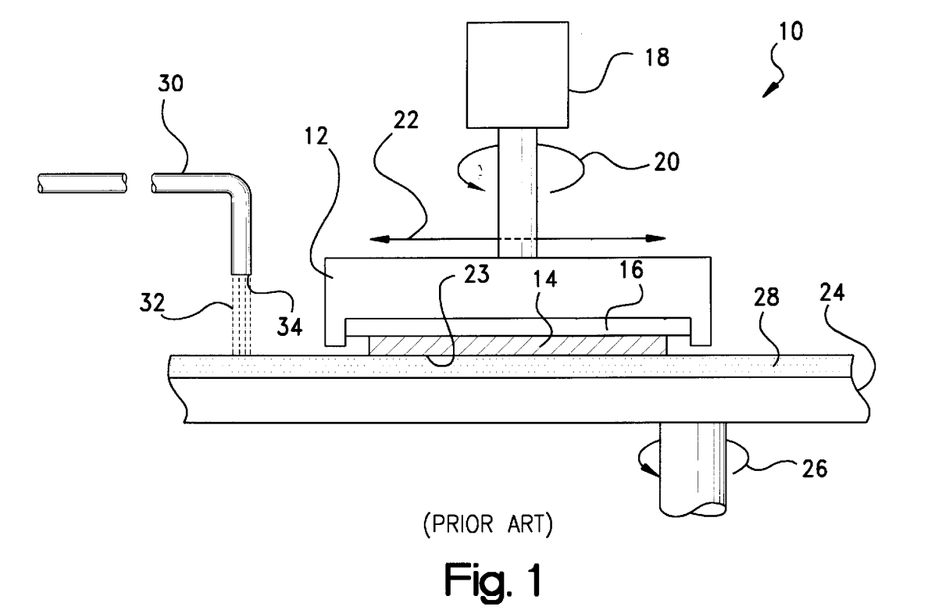
FIG. 1 is a schematic view of a representative CMP process according to the prior art.

Looking to FIG. 1, a representative CMP process and apparatus therefor are illustrated schematically at 10. The apparatus 10 includes a wafer carrier, 12, for holding a semiconductor wafer or other workpiece, 14. A soft, resilient pad, 16, is positioned between wafer carrier 12 and wafer 14, with the wafer being held against the pad by a partial vacuum, frictionally, or with an adhesive. Wafer carrier 12 is provided to be continuously rotated by a drive motor, 18, in the direction referenced at 20, and additionally may be reciprocated transversely in the directions referenced at 22. In this regard, the combined rotational and transverse movements of the wafer 14 are intended to reduce the variability in the material removal rate across the work surface 23 of the wafer 14.

Apparatus 10 additionally includes a platen, 24, which is rotated in the direction referenced at 26, and on which is mounted a polishing pad, 28. As compared to wafer 14, platen 24 is provided as having a relatively large surface area to accommodate the translational movement of the wafer on the carrier 12 across the surface of the polishing pad 28.

A supply tube, 30, is mounted above platen 26 to deliver a stream of polishing slurry, referenced at 32, which is dripped or otherwise metered onto the surface of pad 28 from a nozzle or other outlet, 34, of the tube 30. The slurry 32 may be gravity fed from a tank or reservoir (not shown), or otherwise pumped through supply tube 30. Alternatively, slurry 32 may be supplied from below platen 26 such that it flows upwardly through the underside of polishing pad 28.

Slurries for CMP, which are further described in U.S. Pat. Nos. 5,516,346; 5,318,927; 5,264,010; 5,209,816; 4,954,142, may be of either an oxide, i.e., ceramic, or metal abrasive particle type. Common oxide-type particles include silica ($SiO_2$), ceria ($CeO_2$), silicon carbide (SiC), silicon nitride ($Si_3N_4$), iron oxide ($Fe_2O_3$), alumina ($Al_2O_3$), and the like, with common metal particles including tungsten and copper. The slurry, which may be acidic or basic, typically is formulated to have a relatively high solids level which may be about 40% or more by weight, with a mean average abrasive particle size, which typically is given as a distribution range, of limits between about 0.05–5.0 $\mu$m for oxide slurries and about 20–35 $\mu$m for tungsten slurries.

It has been observed, however, that as a result of agglomeration and drying from exposure to air, particles larger than the mean average range may develop within the slurry. Although the metal-type slurries generally are more susceptible to agglomeration than the oxide types, the problem may present in either type of slurry depending upon the slurry composition and ambient conditions. Should the agglomerated particles be entrained within the CMP slurry, significant damage to the to the wafer surface being planarized can result. Moreover, it is known that to achieve a low defect rate and high wafer yield, each successive wafer substrate should be polished under substantially similar conditions.

It therefore has been proposed to filter the CMP process stream during its manufacture and/or at the point of use to separate agglomerated particles of a size larger than a predetermined limit, typically the mean average size range, from the balance of the slurry. For oxide slurries, filters employing conventional membranes elements of a phase inversion or bi-axially stretched variety generally having particle retention ratings between about 0.3–0.65 $\mu$m initially were suggested. In service, however, membranes filters of such type were observed to load almost instantaneously with particles and soon were judged unacceptable for the CMP process. The characteristics of conventional membrane filter media are described in greater detail in U.S. Pat. Nos. 5,449,917; 4,863,604; 4,795,559; 4,791,144; 4,728,394; and 4,188,354.

Alternative filter elements which have met with more success in the CMP process employ fibrous media, such as randomly orientated webs. Indeed, unlike membranes that rely on surface-type filtration, these fibrous media utilize a tortuous path, depth-type filtration mechanism. In order to provide acceptable service life, however, a fibrous media must be selected as having a relatively open and permeable structure rated, for example, at about 40–100 µm absolute or 5–30 µm nominal. Such a rating ensures substantially no retention of particles in the 0.5–2 µm range which could cause cake formation and, ultimately, premature blockage of the filter element. As a drawback, the more open and permeable structure is ineffective for oxide slurries, which have a smaller particle size as compared to metal slurries. Moreover, fibrous media in general characteristically exhibit a gradually decreasing retention profile as a function of decreasing particle size which is in contrast to the sharper retention cutoff exhibited by membranes and other surface-type media. Depth-type and other filter media are described in further in U.S. Pat. Nos. 5,637,271; 5,225,014; 5,130,134; 4,225,642; and 4,025,679.

In view of the foregoing, it will be appreciated that further improvements in the design of elements for CMP process would be well-received by the semiconductor manufacturing industry. Especially desired would be a filter element meeting the rigorous performance requirements of oxide slurries in exhibiting a membrane-like, sharp particle retention profile, but with a service life which is more like that of a depth-type filtering media.

BROAD STATEMENT OF THE INVENTION

The present invention is directed to a filter element media for chemical-mechanical polishing (CMP) slurries which provides the separation performance of membranes, but which affords a service life more comparable to that of fibrous, depth-type media even with oxide slurries. Such media is provided as a track-etched or other porous polymeric membrane having generally cylindrical capillary pores of a true size or diameter of, preferably, less than about 10 µm when used for oxide slurries having a mean average particle size of less than about 5 µm. Advantageously, such media has a relatively simple pore structure and may be provided as having a relatively narrow pore size distribution of less than about ±10% and preferably about ±5%. That is, the pores of such media are of a generally uniform diameter which is sized as being effective to capture particles larger, e.g., by about 0.1–1.0 µm or more, than the mean average particle size. Such structure and sizing ultimately results in the filter element exhibiting a more narrowly defined particle size retention profile which is particularly adapted for oxide slurry CMP applications. However, unlike conventional phase inversion or bi-axially stretched membrane filter elements heretofore known in the art, the cylindrically-pored membrane filter elements of the present invention exhibit a much improved service life.

In a preferred embodiment, the filter element of the invention is provided as being formed of an ion track-etched polyester, polyvinylidene fluoride, or polycarbonate membrane. A particularly preferred membrane for slightly acidic or basic oxide slurries having a mean average particle size, which may be a distribution range or an absolute value, of less than about 1 µm is an ion track-etched, polyester membrane having a true pore size of between about 1–5 µm at 5–20% porosity and a thickness of between about 10–30 µm. For typical CMP process applications, a single sheet of the membrane may be pleated into a cylindrical element configured to be received within a conventional cartridge or other filter assembly.

Unexpectedly, it has been discovered that the membrane filter element media of the present invention exhibits a sharp, i.e., well-defined particle retention cutoff which is appreciably smaller than the pores of the membrane. For example, for a test dust slurry having a mean average particle size range of between about 0.6–0.8 µm, a membrane having a true pore size of 3 µm was observed to effect the separation of about 96% of particles in the 1 µm range, with only about 3% of particles in the 0.6 µm range being removed. This observation suggests a sharp 1 µm particle retention cutoff for such membrane rather than the 3.0 µm cutoff which may have been expected. Advantageously, such separation response allows the use of a membrane having a pore size which is larger, i.e., by 1 µm or more, than the specified cutoff limit.

The ability to effect a smaller particle size cutoff limit with a membrane having a larger pore size is seen as affording the provision of a CMP filter membrane having a service life which is expected to be longer than the filter membranes heretofore known in the art. That is, substantially no, i.e., less than about 5%, of particles within the mean average particle size range are retained, while substantially all, i.e., over about 95%, of the particles larger than the mean are captured. As the majority, i.e., 99% or more, of the particles of a CMP processing slurry typically are distributed within a narrow mean average size range, it will be appreciated that the retention of even a small percentage of the particles within that range would quickly plug the filter and result in its premature failure. As used herein, "mean average particle size" or "mean average particle size range" should be understood to refer, interchangeably, to the aforesaid majority size or distribution range.

It therefore is a feature of a disclosed embodiment of the present invention to provide a filter media for physically separating particles of an abrasive media having a given mean average particle size from a chemical-mechanical polishing (CMP) slurry. The abrasive media has a particle size distribution including particles larger than the mean. The filter media is provided as being formed of at least one sheet of a porous membrane having a first and second surface defining a thickness dimension of the membrane therebetween, and having a plurality of generally cylindrical pores formed through the thickness dimension sized effective to capture said particles larger, e.g., by about 0.1 than the given mean. In service, the slurry is supplied to the first side of the filter media, and is passed through the media to the second side thereof such that at least a portion of the particles of the abrasive media larger than the specified particle size limit is retained on the first side of the filter media. Such portion may include particles of the abrasive media which, although larger than the mean, are smaller than the pore size, i.e., diameter, of the membrane.

The present invention, accordingly, comprises the material and method possessing the construction, combination of elements, and arrangement of parts and steps which are exemplified in the detailed disclosure to follow. Advantages of the present invention include a track-etched or other membrane filter element for CMP processing which exhibits a sharp, well-defined particle retention profile, but which exhibits a service life comparable to that of a depth filtering media. Additional advantages include an economical filter element construction which may be used in conventional cartridge and other filter assemblies. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "upper" and "lower" designate directions in the drawings to which reference is made, with the terms "inner" or "interior" and "outer" or "exterior" referring, respectively, to directions toward and away from the center of the referenced element, and the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the illustrative purposes of the discourse to follow, the filter media of the invention herein involved is described in connection with its use as a filter element within a conventional cartridge filter assembly which is coupled in fluid communication with a chemical-mechanical polishing (CMP) slurry. Assemblies of such type and their construction are described further in commonly-assigned U.S. Pat. No. 5,154,827, and elsewhere in U.S. Pat. Nos. 4,056,476; 4,104,170; 4,663,041; 5,154,827; and 5,543,047. It will be appreciated, however, that aspects of the present invention may find utility in other filter assembles such as capsules having integral media, housings, fittings, and the like. Aspects of the present invention may find utility in the manufacture of CMP slurries. Use within those such other applications therefore should be considered to be expressly within the scope of the present invention.

Figure 2:
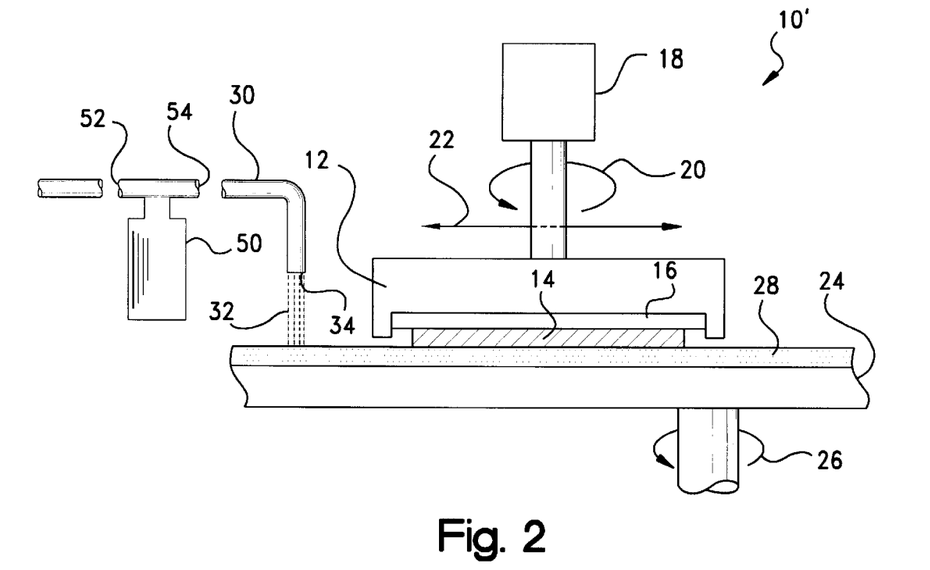
FIG. 2 is a schematic view of the representative CMP process of FIG. 1 as modified in accordance with the present invention to include a filter for treating the polishing slurry process stream.

Referring then to the figures, wherein corresponding reference characters are used to designate corresponding elements throughout the several views, the CMP apparatus 10 of FIG. 1 reappears at 10' in FIG. 2. As is conventional in the art, apparatus 10' is specified to be operated within a predetermined processing window, and includes a cartridge-type or other filter assembly, 50. Filter assembly 50 is provided for separating agglomerated or otherwise over-sized abrasive particles, which for oxide slurries may be between about 0.1–10 $\mu$m or larger in size. Such particles, falling outside of the processing window and within a specified particle size cutoff requirement or other limit, are separated from the balance of the slurry stream 32 which may have a specified mean average particle size or distribution range of between about 0.05–5 $\mu$m. In the arrangement shown, filter assembly 50 is incorporated into the CMP process at the point of use by its mounting within supply tube 30 upstream of the outlet 34 thereof. Assembly 50 conventionally includes an inlet, referenced at 52, for supplying the untreated slurry stream 32 to the first side of an internal filter media cartridge, and an outlet, referenced at 54, for the discharge of the treated slurry stream passed through the filter media to the second side thereof.

Figure 3:
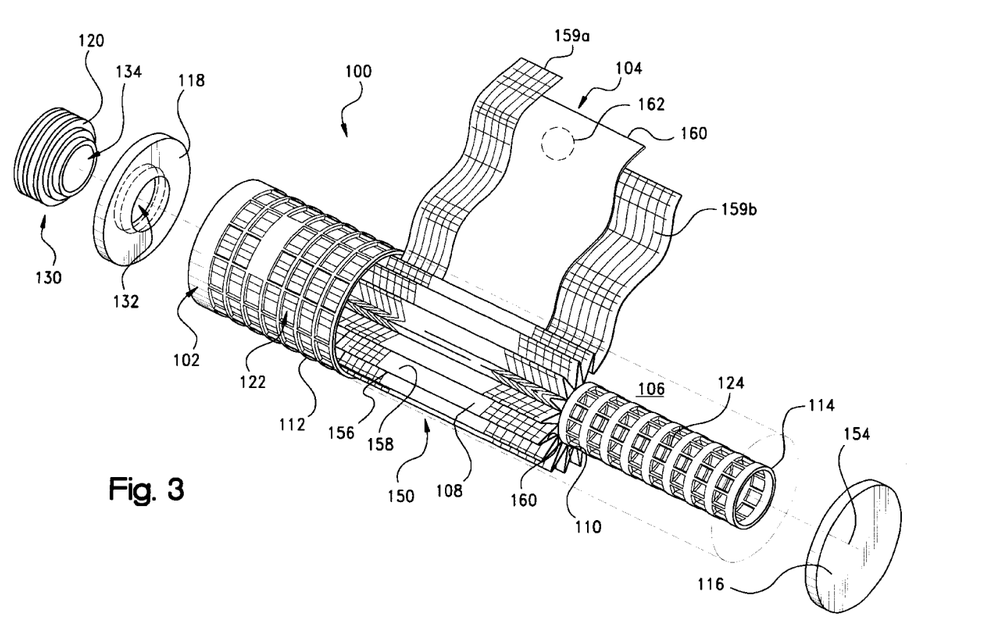
FIG. 3 is an exploded, cut-away view of a representative filter cartridge for the CMP process of FIG. 2 as including a membrane filter element according to the present invention.

Turning next to FIG. 3, an exploded view of a filter cartridge adapted to be received within a filter assembly such as assembly 50 of FIG. 2 is shown generally at 100. In basic construction, cartridge 100 includes an annular body, referenced generally at 102, and a filter media, referenced generally at 104, which is supported within the annulus, referenced at 106, of body 102 as having an outer or upstream first side, 108, and an inner or downstream second side, 110. Body 102 is of a conventional design and is formed as having an outer tubular member or cage, 112, a concentrically-disposed, tubular inner member or core, 114, distal and proximal end caps, 116 and 118, respectively, and a proximal end cap fitting, 120. As is shown, cage 112 and core 114 each are highly permeable in being formed as having a plurality of fluid openings, one of which is referenced at 122 for cage 112 and at 124 for core 114. With media 104 being retained coaxially within cage 112, core 114 is received through the media for supporting the inner periphery thereof against radially-directed fluid forces.

Each of the components of body 102 are joined, such as with fusion bonding techniques, into a generally cylindrical structure for receiving media assembly 104. In this regard, the components may be molded or otherwise constructed of a melt-processible thermoplastic polymeric material which, depending upon such factors as chemical compatibility and service temperature, may be a fluoropolymer such as fluorinated ethylenepropylene (FEP) or polyfluororalkoxy resin (PFA), or a polyolefin such as polypropylene. Alternatively, the body components may be adhesively bonded or otherwise joined via an interference fit or with mechanical fasteners.

In order that that fluid flowing through cartridge 100 passes through the media 104 for separation, end caps 112 and 114 additionally must be sealed to the media 104. That is, with the cartridge inlet defined by the openings 122 of cage 112, fluid flow may proceed through the media and the openings 124 of core 114 for discharge from the cartridge through an outlet port, 130, defined at the proximal end thereof. Such port is formed in the illustrated embodiment by a central opening, 132, of proximal end cap 118 which is registered axially with a corresponding central opening, 134, of proximal end cap fitting 120. In service, cartridge 100 is sealed at end cap fitting 120 within a filter housing (not shown). Untreated fluid is admitted into the housing via one or more inlet ports formed therein and is exhausted through the outlet port 130 of the cartridge.

For illustrative purposes, media 104 is shown to be configured as a generally cylindrical filter element, referenced generally at 150. Filter element 150 is of a given diameter, typically about 2–3.5 inches (5–9 cm), and extends along a central longitudinal axis, 154, to a typical length of from about 4–10 inches (10–25 cm). Element 150 further is configured as having a plurality of longitudinally-extending, accordion-like pleats, one of which is referenced at 156, to increase the effective filtering area thereof. Each of pleats 156 has a radial outer surface portion, 158, which defines the first side 108 of filter media 104, and a radial inner surface portion, 160, which defines the second side 110 of the media.

Within outer cage 112, pleats 156 are protected from deformation by shear or other fluid forces.

In a preferred arrangement, element 150 may be interposed between a pair of drainage layers, 159a–b, with a first or upstream drainage layer, 159a, being disposed adjacent the media first side 108, and second or downstream drainage layer, 159b, being disposed adjacent the media second side 110. Each of drainage layers 159, which conventionally are folded with element 150 to conform to the pleats 156 thereof, preferably are provided as being formed of a very open metal or polymeric mesh material having a pore size, for example, of between about 100–600 $\mu$m. Such material particularly may be selected to exhibit a transverse pressure drop, i.e., in a direction parallel to its surface, that is less than the pressure across media 104, i.e., in a direction perpendicular to its surface, for promoting a more uniform distribution of fluid across the corresponding surfaces of element 150.

Element 150 is provided as being fashioned of at least one sheet, 160, of a porous, preferably polymeric membrane, referenced at 162, which is sequentially folded to form pleats 156. As may be seen best with additional reference to the magnified cross-sectional view of FIG. 4, membrane 162 has a first surface, 164, and a second surface, 166, defining a thickness dimension, referenced at "t", therebetween. For most CMP filtering applications utilizing oxide particle slurries having a mean average particle size of between about 0.05–5.0 $\mu$m, a single membrane sheet having a thickness t of between about 10–30 $\mu$m would be considered preferred.

Figure 4:
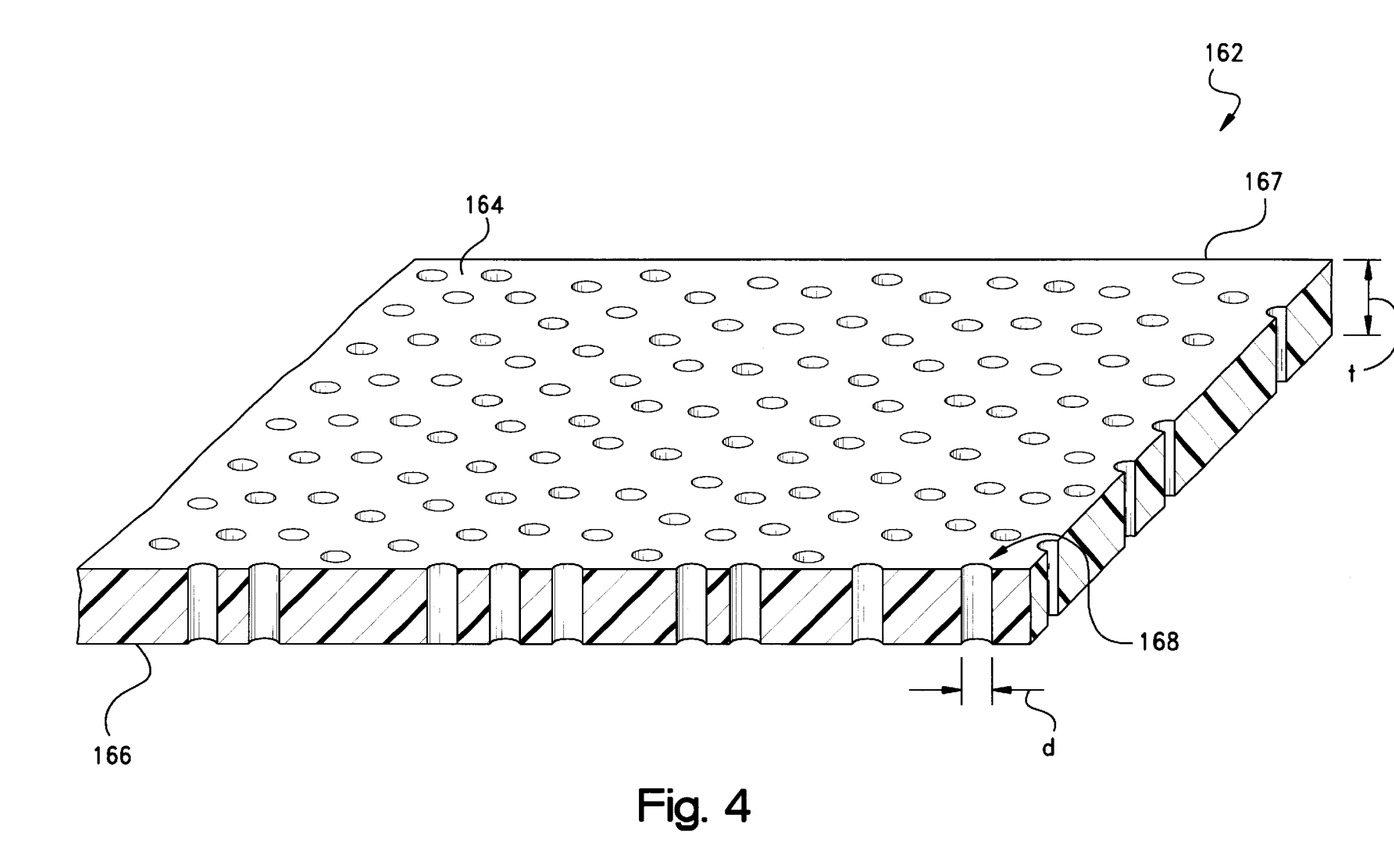
FIG. 4 is an isometric, cross-sectional view of the membrane filter element of FIG. 3 which is magnified to reveal the structure of the membrane media thereof.

Continuing then with the magnified view of FIG. 4, a preferred structure for membrane 162 is shown as consisting of a layer of a polymeric film, 167, through the thickness dimension t of which is formed a plurality of spaced-apart capillary pores, one of which is referenced at 168. Capillary pores 168 are generally uniform with each having a generally cylindrical geometry and extending through the thickness dimension of the film layer 167 from first surface 164 to the second surface 166 thereof. Such a relatively simple pore structure advantageously produces a molecular sieve-like surface capture of particles larger than the pore size, and is to be contrasted with a more complex, web-like pore structure characteristic of solvent cast and stretched membranes wherein particles are randomly trapped within a filter matrix. Accordingly, the membrane 162 of the present invention is able to effect a more selective particle size separation and sharper retention cutoff in that fewer particles a certain size limit will be retained as otherwise would be captured within a narrow or tortuous portion of the pore path.

For oxide-based slurries having a mean average particle size range of less than about 5 $\mu$m, membrane 162 typically will be selected as having a true pore size or diameter, referenced at "d," of less than about 10 $\mu$m which is effective to capture particles larger, e.g., by about 0.1–1.0 $\mu$m or more, than the mean size. "True pore size" is used herein to refer to the actual pore diameter as measured directly by electron microscopy or other means, or indirectly by bubble point pressure determination or other means, and should be contrasted with a nominal or absolute pore size rating assigned on the basis of a percentage particle retention. Preferably, the pore size will be generally uniform as narrowly distributed with a deviation of between about ±5–10%. The membrane may have a total porosity or open area of between about 5–20% or otherwise as selected depending upon the desired flow rate through the filter element.

Polymeric membrane materials suitable for membrane 162 in CMP applications will depend, particularly, upon the chemical composition of the slurry being handled and on the temperature thereof. Although thermoplastic resins may be preferred for ease of manufacturing, other types of resins may be substituted, however, again as selected for chemical compatibility with the slurry being handled or for desired mechanical or thermal properties. Suitable resins include polyolefins such as polypropylene, polyamides, polyesters, aramids, polyacrylonitriles, fluoropolymers, vinyl ethers, polyphenylene sulfides, polyvinylidene chlorides, polyvinyl acetates, polystryenes, polyurethanes, polycarbonates, polyethersulfones, and copolymers and blends thereof.

A particularly preferred and relatively economical membrane for slightly acidic or basic oxide slurries having a mean average particle size of less than about 1 $\mu$m is an ion track-etched polyester membrane having a true pore size of between about 1–5 $\mu$m at about 20% porosity and a thickness of about 20 $\mu$m. Membranes of such type are marketed commercially under the tradename "CYCLOPORE®" by Whatman, Inc., of Fairfield, N.J.

By "track-etched" it is meant that the capillary pore membrane is produced by exposing a polycarbonate, polyester, or other polymeric film to a collimated, bombarding beam of heavy ions or alpha particles accelerated by a high energy cyclotron or other means. The accelerated ions travel though the thickness dimension of the film creating tracks of molecular damage. The film so exposed is subjected to chemical etching which selectively attacks the material along the damage tracks forming a plurality of cylindrical pores through the film. Track-etched membranes are further described in U.S. Pat. Nos. 5,449,917; 4,956,219; 4,872,888; 4,770,785; 4,268,347; 3,852,134; 3,992,495; and 3,846,521, and in the publication "Particle Track Membrane Made of Polyester," Academy of Sciences of the German Democratic Republic.

However, other membranes exhibiting generally cylindrical and relatively uniform capillary pore structures may find utility in the present invention, and therefore should be considered to be within the scope thereof. Other such membranes may include laser-etched membranes as are further described in International Publication No. WO 98/30317, and photolithographic-etched membranes as are further described in U.S. Pat. No. 5,753,014.

Figure 5:
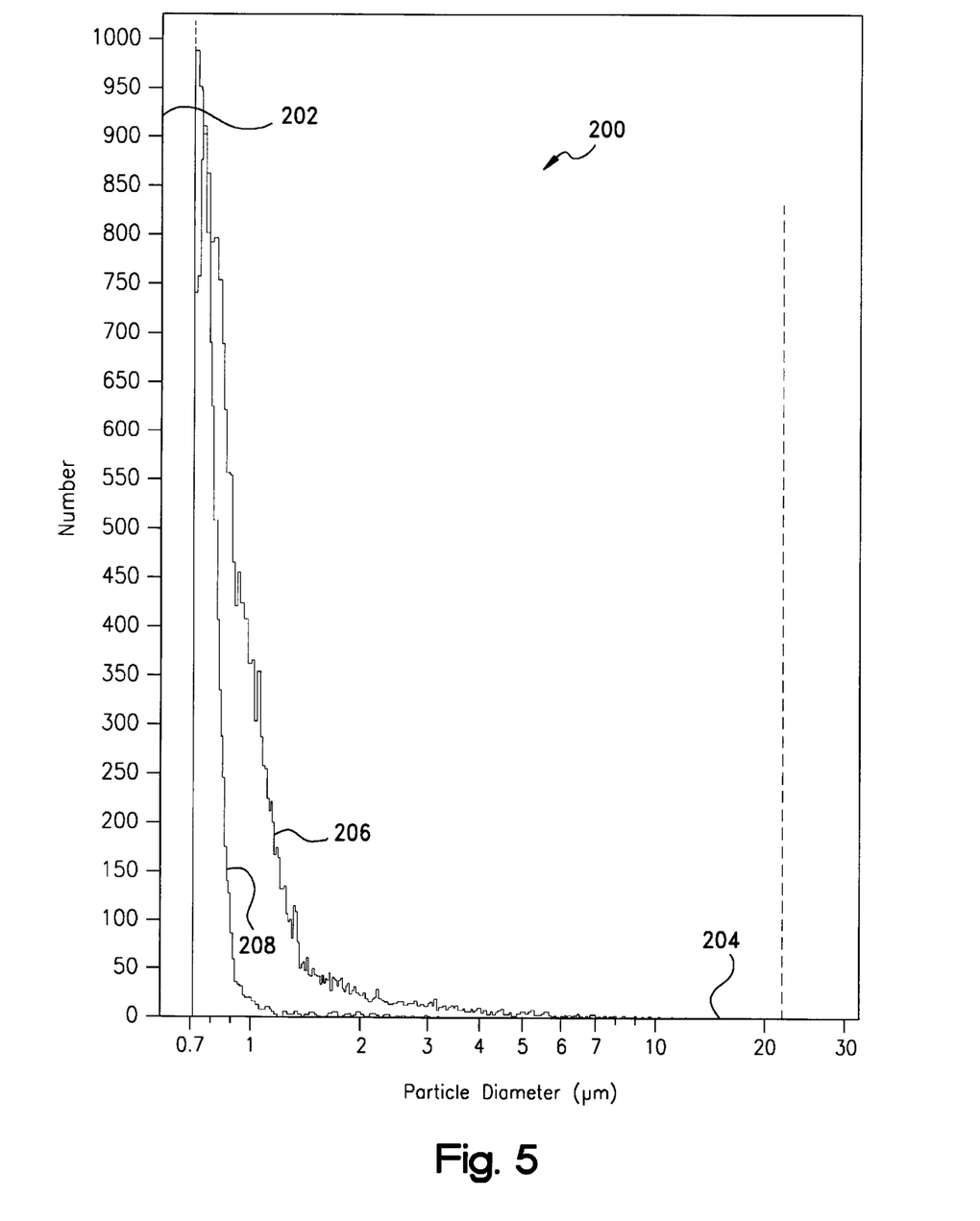
FIG. 5 is an experimentally determined plot of particle count number versus particle diameter illustrative of the particle size distribution in a representative test dust slurry as measured both upstream and downstream of a filter constructed in accordance with the present invention.

Continuing with FIG. 5, the separation performance of a representative ion tracketched, polyester filter membrane (Whatman, Inc. CYCLOPORER®, 3 $\mu$m true pore size ±5%, 20 $\mu$m nominal thickness, 21% porosity) in accordance with the present invention is shown generally at 200 as a function of particle number, plotted on the axis referenced at 202, versus particle diameter, plotted on the axis referenced at 204. Particle count measurements were made using a COULTER COUNTER® Multisizer (Beckman Coulter, Inc., Fullerton, Calif.) both upstream and downstream of the filter, and are portrayed graphically as the upstream particle distribution curve referenced at 206, and the downstream particle distribution referenced at 208. The upstream distribution curve 206 also is a representation of the particle size distribution of the test slurry which comprised an aqueous suspension of SAE fine dust. Such slurry was determined to have a mean average particle size distribution range of between about 0.6–0.8 $\mu$m.

The downstream curve 208 suggests a particle size retention cutoff limit of about 1 $\mu$m in that about 96% of 1 $\mu$m size particles were removed, with only about 3% of particles in the 0.6 $\mu$m range being removed. That is, substantially no, i.e., less than about 5%, of particles within the mean average particle size range were retained, while substantially all, i.e., over about 95%, of the particles larger than the mean size were removed. Such limit, however, is about 2 μm less than the 3.0 μm retention cutoff which otherwise would have been predicted for a conventional 3 μm membrane, and accordingly allows the use of a membrane having a pore size which is larger, i.e., by about 1 μm or more, than the given mean size or other specified retention cutoff limit. In this regard, as the majority, i.e., 99% or more, of the slurry particles are distributed within the mean average particle size range, it will be appreciated that the retention of even a small percentage of the particles within that range would quickly plug the filter and result in its premature failure. The ability to effect a smaller particle size retention cutoff limit with a membrane having a larger pore size which retains fewer of the particles within the mean average size range therefore is seen as affording the provision of a CMP filter membrane having a service life which is expected to be longer than that of the membranes heretofore known in the art.

Thus, a membrane filter media offering a unique convergence of properties is described which is especially adapted for use in CMP slurries. Such media unexpectedly exhibits a exhibits a sharp, well-defined particle retention profile characteristic of a surface filtering membrane, but with a service life comparable more to that of depth filtering media.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A method of physically separating particles of an abrasive media larger than a specified particle size cutoff limit from a chemical-mechanical polishing (CMP) slurry, said method comprising the steps of:

(a) providing a filter media having a first and second side and being formed of at least one sheet of a porous membrane having a first and second surface defining a thickness dimension of said membrane therebetween, said membrane having a plurality of generally cylindrical capillary pores formed through said thickness dimension, each of said pores being of about the same diameter, said diameter of said pores being larger than said specified particle size cutoff limit;

(b) supplying the CMP slurry to the first side of said filter media; and (c) passing the CMP slurry through said filter media to the second side thereof whereby at least a portion of said particles of said abrasive media larger than said specified particle size cutoff limit is retained on the first side of said filter media, said portion including particles which are smaller than said diameter of said pores of said membrane.

2. The method of claim 1 wherein said membrane of step (a) is a formed of a polymeric material and wherein said pores of said membrane are formed by ion track etching.

3. The method of claim 2 wherein said polymeric material is selected from the group consisting of polyolefins, polycarbonates, polyamides, polyesters, aramids, polyacrylonitriles, fluoropolymers, vinyl ethers, polyphenylene sulfides, polyvinylidene fluorides, polyvinylidene chlorides, polyvinyl acetates, polystryenes, polyurethanes, polycarbonates, polyethersulfones, and copolymers and blends thereof.

4. The method of claim 1 wherein said abrasive media has a given mean average particle size and said specified particle size cutoff limit is at least about equal to said mean average particle size, and wherein substantially all said particles of said abrasive media larger than said mean average particle size are retained on the first side of said filter media in step (c), and substantially no particles of said abrasive media of said mean average particle size are retained on the first side of said filter media in step (c).

5. The method of claim 4 wherein said mean average particle size of said abrasive media is less than about 5 μm, and said diameter of said pores of said membrane is less than about 10 μm.

6. The method of claim 4 wherein said mean average particle size of said abrasive media is less than about 1 μm, and said diameter of said pores of said membrane is between about 1–5 μm.

7. The method of claim 1 wherein said diameter of said pores of said membrane is at least about 1 μm larger than said specified particle size cutoff limit.

8. The method of claim 6 wherein said diameter of said pores of said membrane is about 3 μm.

9. The method of claim 1 wherein said abrasive media comprises ceramic particles, metal particles, or a mixture thereof.

10. The method of claim 1 wherein the thickness dimension of said membrane of step (a) is between about 10–30 μm.

11. The method of claim 1 wherein said filter media is provided in step (a) as a generally cylindrical filter element having a central longitudinal axis and a plurality of longitudinally-extending, accordion-type pleats formed by sequentially folding said sheet, said pleats having radial outer surface portions formed by the first surface of said sheet and defining the first side of said filter media, and radial inner surface portions formed by the second surface of said sheet and defining the second side of said filter media.

12. The method of claim 11 wherein said filter media is further provided in step (a) as interposed between a first drainage layer disposed on the first side of said filter media, and a second drainage layer disposed on the second side of said filter media, each said drainage layer being folded with said sheet to conform therewith, and being formed of a mesh material for distributing the slurry across the first and second surfaces of said filter media.

13. The method of claim 11 wherein said filter element is received within a filter assembly, said assembly being coupled in fluid communication with the slurry and having an inlet for supplying the slurry to the first side of said filter media, and an outlet for the discharge of the slurry passed through said filter media to the second side thereof.

* * * * *